(12) United States Patent
Reeves

(10) Patent No.: US 8,840,121 B2
(45) Date of Patent: Sep. 23, 2014

(54) ADJUSTABLE LIFT ASSEMBLY FOR HAND TRUCKS

(71) Applicant: Robert Reeves, Long Beach, CA (US)

(72) Inventor: Robert Reeves, Long Beach, CA (US)

( * ) Notice: Subject to any disclaimer, the term of this patent is extended or adjusted under 35 U.S.C. 154(b) by 0 days.

(21) Appl. No.: 13/645,428

(22) Filed: Oct. 4, 2012

(65) Prior Publication Data

US 2014/0097584 A1    Apr. 10, 2014

(51) Int. Cl.
*B62B 1/12* (2006.01)
(52) U.S. Cl.
USPC .......................... 280/47.29; 414/444; 414/490
(58) Field of Classification Search
USPC ............ 414/446, 444, 490; 280/47.27, 47.28, 280/47.29
See application file for complete search history.

(56) References Cited

U.S. PATENT DOCUMENTS

| | | | | |
|---|---|---|---|---|
| 4,421,209 | A * | 12/1983 | Vermette et al. | 187/235 |
| 5,251,922 | A * | 10/1993 | Mann | 280/47.29 |
| 6,309,168 | B1 * | 10/2001 | Holmes | 414/490 |
| 6,457,727 | B1 * | 10/2002 | Tolly | 280/47.28 |

* cited by examiner

Primary Examiner — John Walters
(74) Attorney, Agent, or Firm — Law Office of Michael O'Brien

(57) ABSTRACT

A system is provided for temporarily converting a conventional hand truck to provide an adjustable platform. The system may comprise a shelving unit and a control unit, where the control unit is configured to raise and lower the shelving unit on the frame of the transporting device. The shelving unit may comprise a platform for supporting removable items thereon, and a back plate configured to engage a portion of the transporting device frame, where the back plate comprises a plurality of rollers that minimize lateral movement of the shelving unit when it is being raised or lowered during operation. The control unit may comprise a drive unit and a cable system configured to permit the drive unit to direct movement of the shelving unit, the cable system comprising at least one cable, at least one pulley, and a winch upon which a portion of the cable may be radially wound.

7 Claims, 4 Drawing Sheets

ADJUSTABLE LIFT ASSEMBLY FOR HAND TRUCKS

RELATED APPLICATION

This application is based on and claims priority to U.S. Provisional Application No. 61/554,792 filed Nov. 2, 2011, which application is incorporated herein by reference in its entirety.

BACKGROUND

The embodiments herein relate generally to a system for converting hand trucks with fixed platforms and having one of a variety of configurations so as to provide an adjustable shelf assembly.

Hand trucks are useful for moving large and/or heavy items from place to place. However, conventional hand trucks have fixed platforms, limiting the ability to move items from one height to another. Back-breaking efforts are often needed to move items from the fixed platform of a conventional hand truck to its desired destination. The same can be said for moving an item from a particular height above the floor down to the fixed platform.

Efforts have been made in the past to provide a hand truck that employs platform adjustability as sold to consumers, including efforts by this invento as set forth in the '792 Provisional Application incorporated herein. While helpful to those consumers who regularly needed to move items from one height to another, such adjustable platform hand trucks may be more expensive than is necessary for the average consumer who only needs hand trucks to move items from one location to another, or who only regularly moves light objects that do not require back-breaking efforts. On the other hand, if such a consumer already has a conventional hand truck, but wants the ability on occasion to employ the hand truck to move items from one height to another, purchasing a second hand truck with built in adjustability doesn't make much economic sense.

The present invention solves at least some of the limitations associated with prior hand trucks, as described below.

SUMMARY

In embodiments of the present invention, a system for converting a conventional transporting device having a fixed platform into a transporting device having an adjustable platform is provided. In one embodiment, the system comprises a shelving unit comprising both a means or a mechanism for releaseably securing the shelving unit to the frame of the transporting device and a platform for supporting removable items thereon. The system further comprises a control unit for controllably adjusting the elevation of the shelving unit on the frame of the transporting device, the control unit comprising a drive unit for driving the shelving unit either to raise or lower the shelving unit relative to the transporting device frame.

In such an embodiment, the system is configured so that it may be applied to the conventional transporting device in a releasable manner so as to return the conventional transporting device to its initial unconverted state if so desired by the user.

In another embodiment, the control unit may comprise a cable system configured to permit the drive unit to direct movement of the shelving unit, where the cable system comprises at least one cable and at least one pulley. The control unit may further comprise a winch upon which a portion of the cable may be radially wound. In some embodiments, the shelving unit may comprise a back plate configured to engage a portion of the transporting device frame, where the back plate comprises a plurality of rollers that minimize lateral movement of the shelving unit when the shelving unit is being raised or lowered during operation.

One particular system for temporarily converting a conventional transporting device having a fixed platform into a transporting device having an adjustable platform may comprise a shelving unit and a control unit, where the shelving unit is configured to be releaseably secured to the frame of the transporting device in a manner so that the position of the shelving unit on the frame may be adjusted, where the shelving unit comprises both a platform for supporting removable items thereon and a back plate configured to engage a portion of the transporting device frame. The back plate may comprise a plurality of rollers that minimize lateral movement of the shelving unit when it is being raised or lowered during operation. The control unit may be configured to controllably adjust the elevation of the shelving unit on the frame of the transporting device, where the control unit comprises a drive unit for driving the shelving unit either to raise or lower the shelving unit relative to the transporting device frame, and where the control unit comprises a cable system configured to permit the drive unit to direct movement of the shelving unit. The cable system may comprise at least one cable, at least one pulley, and a winch upon which a portion of the cable may be radially wound.

In some embodiments, the pulley comprises a discrete component that may be independently mounted to the frame. In others, the winch may be configured to permit manual operation.

BRIEF DESCRIPTION OF THE FIGURES

The detailed description of some embodiments of the invention will be is made below with reference to the accompanying figures, wherein like numerals represent corresponding parts of the figures.

DETAILED DESCRIPTION OF CERTAIN EMBODIMENTS

Figure 1:
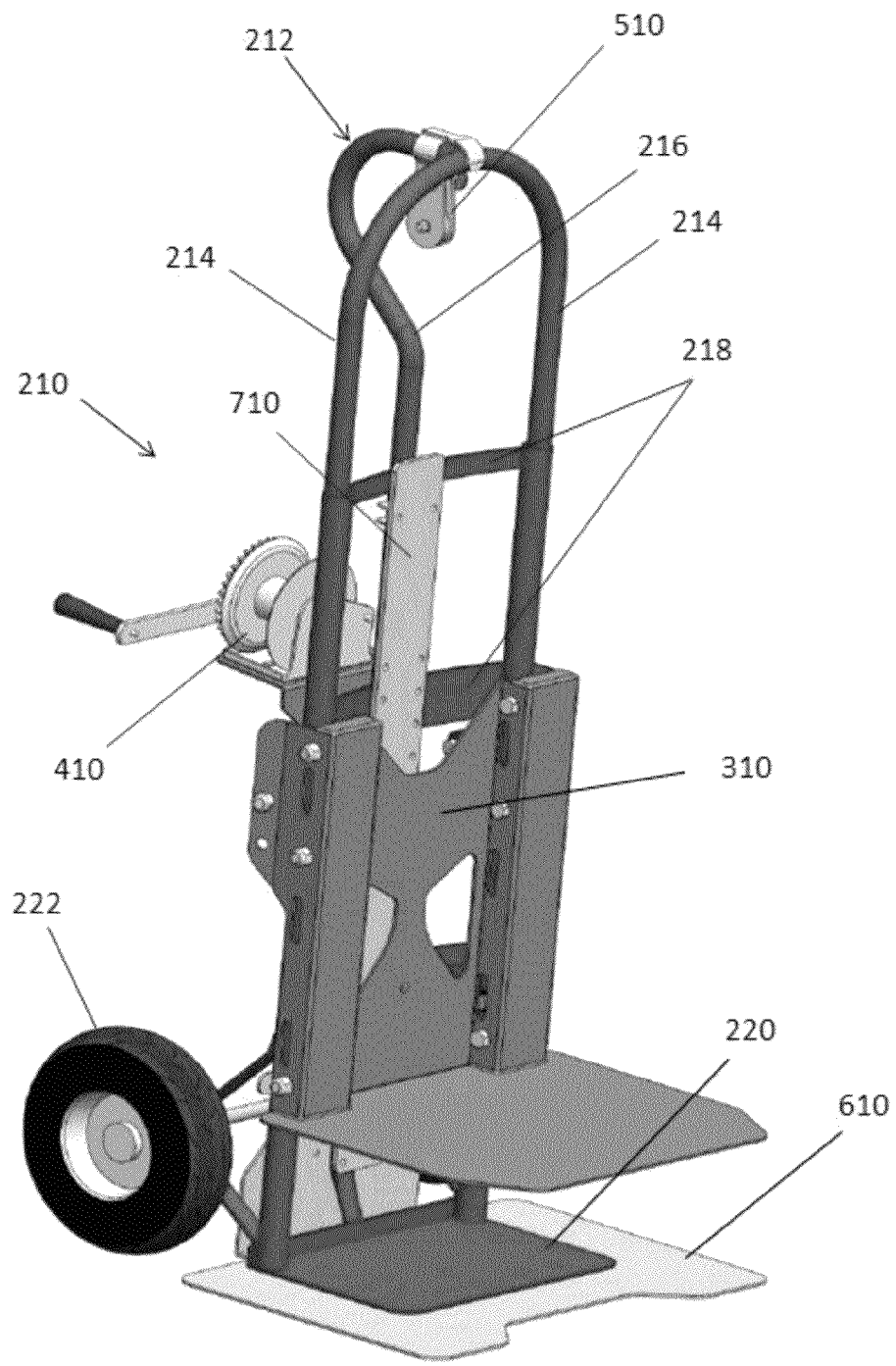
FIG. 1 shows a schematic orthogonal view of one embodiment of an inventive conversion system for converting a conventional hand truck with a fixed platform into a hand truck with an adjustable platform.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. Various inventive features are described below that can each be used independently of one another or in combination with other features By way of example, and referring to FIG. 1, one embodiment of a conversion system 210 is configured to apply to a transport device such as a conventional hand truck 212 having a a frame that includes side rails 214 and in some models a center rail 216. Often hand trucks 212 include cross bars 218, and include a fixed platform 220 and at least one set of wheels 222. In some cases, a second set of wheels are provided (not shown) so that the hand truck may be oriented horizontally rather than vertically as shown in FIG. 1. Some of the inventive conversion systems described herein are contemplated to be applicable to a hand truck that may be operated vertically as well as horizontally.

Still referring to FIG. 1, one embodiment of conversion system 210 comprises main subsystems shelving unit 310 and control unit 410, and optional subsystems pulley system 510, base plate 610 and support plate 710. For ease of viewing, main subsystems shelving unit 310 and control unit 410 are also shown in FIG. 2, although the particular configurations shown are exemplary only.

As described below, and with reference back to FIG. 1, the pulley system 510 may reflect a discrete configuration for independent mounting to the hand truck, or may be incorporated into the shelving unit and/or control unit, depending upon the configuration of the hand truck to which the conversion system is to be applied, or as may be desired for efficiency of operation by the user. The optional base plate 610 may be employed based on the type of load to be carried by the converted transport device. Bulkier loads, or loads that would tend to shift the center of gravity away from the fixed platform 220 of the hand truck 212 may require such a base plate 610 to lend stability. The base plate 610 may be therefore be configured to be applied to the fixed platform 220 and/or the frame side rails 214 or center rail 216 if it is present. Depending upon the particular configuration of the hand truck to which the conversion system is to be applied, the support plate 710 may also be desired to permit secure engagement of the control unit 410 to the hand truck 212. A variety of system configurations are contemplated to address the particular models of transport devices available to consumers.

Figure 2:
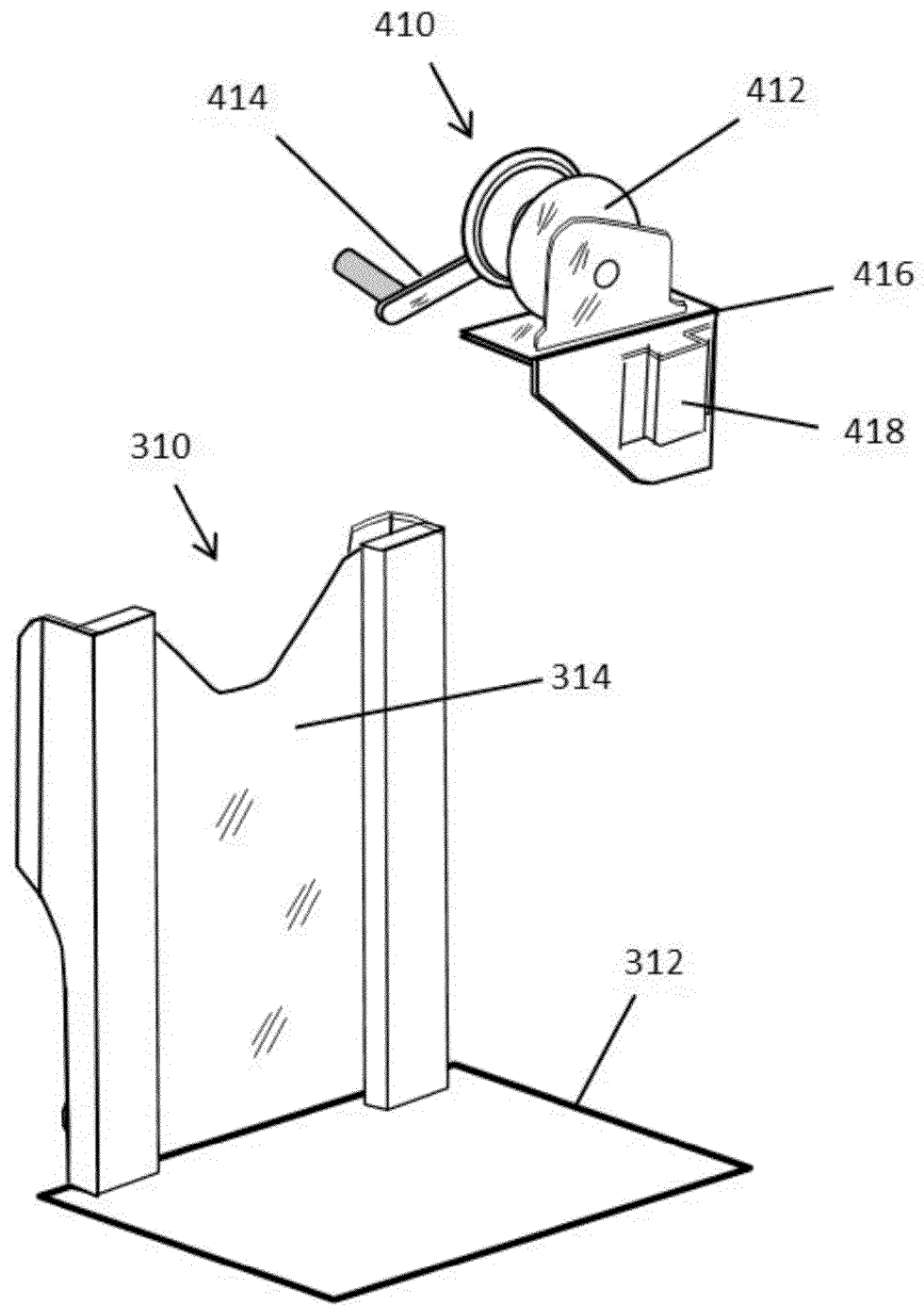
FIG. 2 shows a schematic elevational front view of two main components of one embodiment of the invention hand truck conversion system, a shelving unit and a control unit.

Referring to FIG. 2, one embodiment of the shelving unit 310 comprises a platform 312 and a backing plate 314. In some versions, the platform 312 remains fixed to the backing plate 314. In other versions, it may be pivotally connected to the backing plate so as to permit the platform to be folded upwardly against the back plate. One version of an embodiment with the fixed platform is shown in FIG. 2, but a person of ordinary skill in the art would appreciate that applying hinges (not shown) between the platform and the backing plate could be added if so desired.

The control unit 410 comprises, in some embodiments, a winch configured with a spool 412 that can be rotated using, for example, a handle 414 to permit manual rotation of the spool. Alternatively, the spool 412 may be electromechanically controlled using a motor and controller (neither shown) if so desired. The spool 412 is preferably supported on a base 416 for securing the control unit 410 to the hand truck 212, where the base 416 may optionally include a bracket 418 that could be fastened about a center or side rail of the hand truck frame. One of a number of possible arrangements of control unit bases are contemplated, and may be configured as needed to accommodate the particular configurations of models of hand trucks.

Figure 3A:
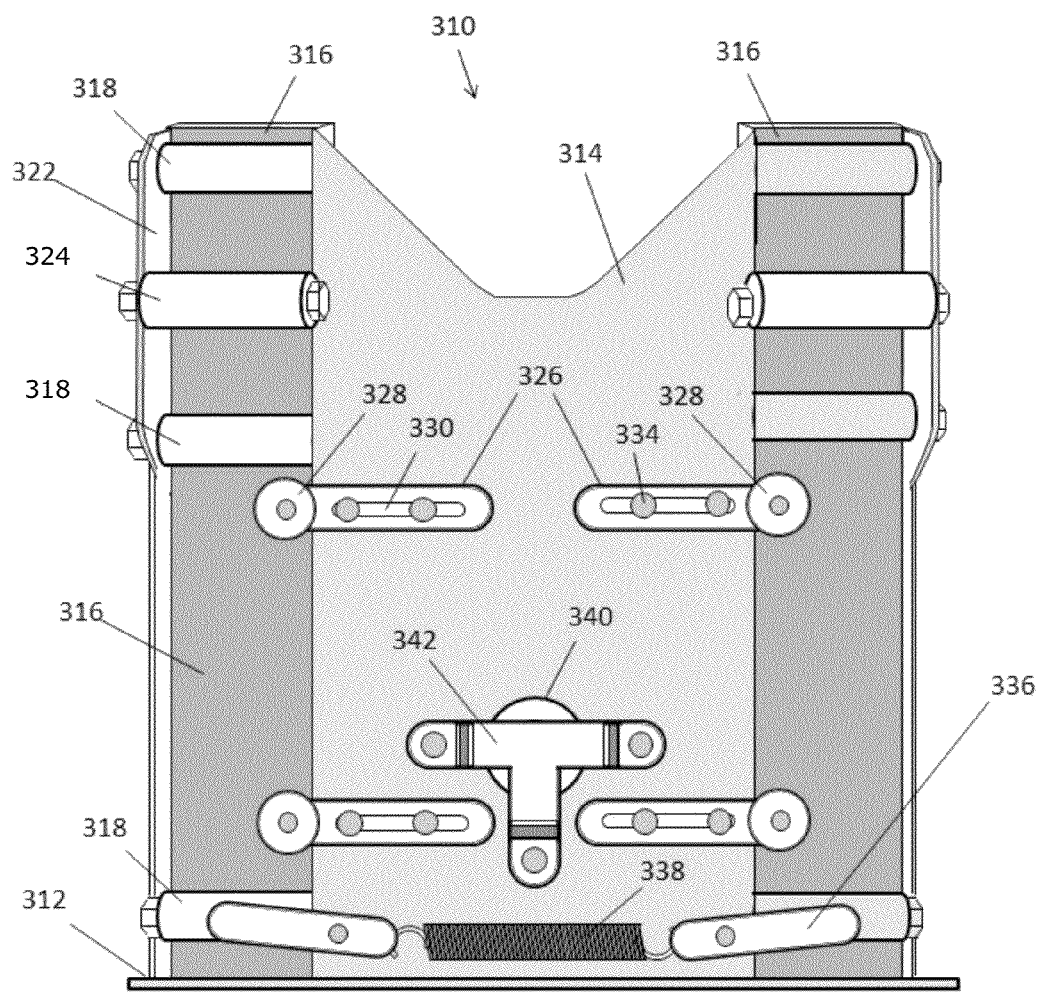
FIG. 3A shows a schematic elevational view of the rear face of one embodiment of the shelving unit.
Figure 3B:
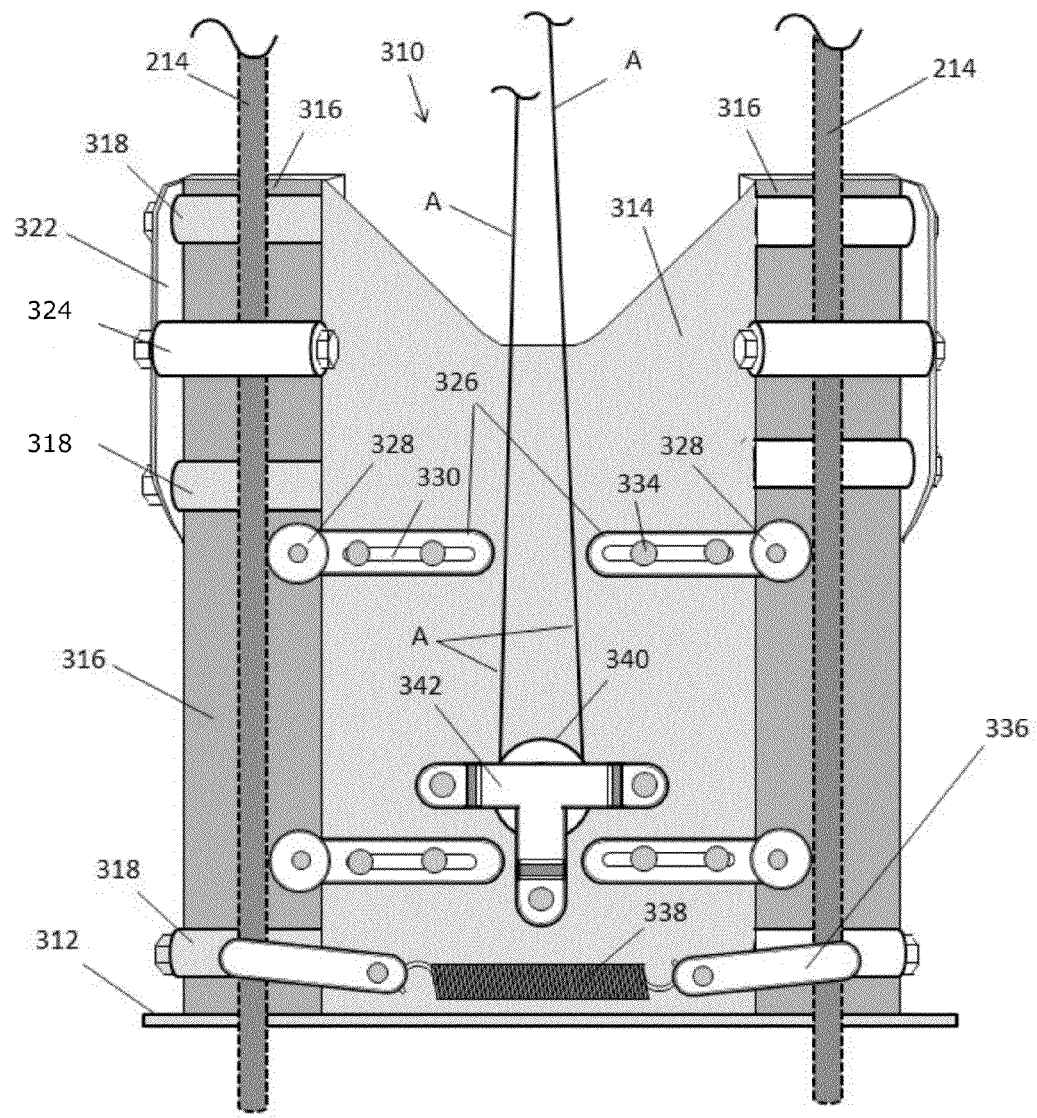
FIG. 3B shows a schematic elevational view of the shelving unit of FIG. 3 as applied to a portion of the frame of a conventional hand truck.

Turning now to FIGS. 3A and 3B, details of certain embodiments of the shelving unit 310 may be explained. In such embodiments, the shelving unit 310 comprises the platform 312 and the backing plate 314, as reflected schematically from the front in FIG. 2.

The backing plate 314, as seen from the rear position in FIGS. 3A and 3B, may comprise two recesses 316 each housing at least one front roller 318 secured to a side wall 322 and at least one rear roller 324 also secured to side wall 322. A plurality of front and one rear rollers may be employed if so desired, and in the case of the embodiment reflected in FIGS. 3A and 3B, three front rollers 318 are employed. Comparing FIG. 3A to 3B, one may appreciate how the shelving unit 310 may be slid over the side rails 214 of the frame so as to fit snugly between the front rollers 318 and the rear roller 324, to provide smooth adjustability to the height of the shelving unit relative to the frame rails 214.

The backing plate 314 further comprises adjustable roller support plates 326 each of which comprises guide rollers 328 secured to the plates 326, where the plates comprises a slot 330 through which fasteners 334 may be used to secure the roller plates 326 in an adjustable fashion to the backing plate 314. The guide rollers 328 are configured to ride along the hand truck side rails 214, so it is intended that the roller plates 326 be adjusted by the fasteners 334 through slots 330 so that the guide rollers 328 engage the side rail 214 tightly. This minimizes sloppy undesired lateral movement of the shelving unit 310 as it is raised and lowered. In some embodiments at least two guide rollers 328 are employed, one for each side rail. In others four or more may be used, as is shown in FIGS. 3A and 3B.

If desired, the backing plate 314 may also comprise a restraining brace 336 for each side rail 214. In some embodiments, the restraining braces 336 are pivotally secured to the backing plate and are configured to rotate to alternatively expose or cover the side rails 214. As shown in FIG. 3B, the restraining braces 336 cover the side rails to assist in constraining the shelving unit 310 to the frame of the hand truck. The restraining braces 336 may be spring actuated so that the natural position is as shown, with each interior end of the restraining braces 336 being connected to a single spring 338, or in alternative embodiments to their own spring for discrete and independent actuation.

As alluded to above, the pulley system 510 may comprise an independent discrete unit or it may comprise components that are affixed directly to the shelving unit 310 and/or the control unit 410. In one embodiment, where the control unit comprises a winch configured to coil and uncoil a cable of one type or another, the shelving unit 310 may comprises a pulley 340 positioned on the backing plate 314, and affixed to the backing plate via a pulley bracket 342, which secures the pulley 340 to the shelving unit in a manner that permit a cable A (see FIG. 3B) of one type or another to wrap around the pulley 340. As one of ordinary skill in the art will appreciate, a pulley system provides a mechanical vehicle for distributing the load carried by the system driving motion of the shelving unit, and that employing multiple pulleys in appropriate positions, the load on the drive motion, or in this case the control unit 410, may be reduced. Thus, although the embodiment of FIGS. 3A and 3B reflects a single pulley on the backing plate 314, a plurality of such pulleys may be employed. Indeed, the pulley unit subsystem 510 may itself comprises a plurality of pulley secured to the frame of the hand truck so that the cable A may be coiled and uncoiled from the control unit 410, wrap around the several pulleys, including the one or more pulleys on the backing plate 314, so impact the force necessary to cause the shelving unit to raise or lower. Where control of the control unit is strictly manual, employing a plurality of pulleys appropriately positioned would ease the burden to the user of cranking the winch 412.

It should be understood, of course, that the foregoing relates to exemplary embodiments of the invention and that modifications may be made without departing from the spirit and scope of the invention as set forth in the following claims.

What is claimed is:

1. A system for converting a conventional transporting device having a fixed platform into a transporting device having an adjustable platform, the system comprising:
    a shelving unit comprising (a) means for releaseably securing the shelving unit to a transporting device frame, and (b) a platform for supporting removable items thereon;
    a backing plate, attached to the frame and further comprising:
    at least one front roller, offset from at least one rear roller configured to minimize movement of the shelving unit in a first direction;
    at least one guide rollers arranged perpendicular to the at least one front roller and the at least one rear roller;
    wherein the plurality of rollers are configured to minimize movement of the shelving unit in a second direction; and
    a control unit for controllably adjusting an elevation of the shelving unit on the frame of the transporting device, the control unit comprising a drive unit for driving the shelving unit either to raise or lower the shelving unit relative to the transporting device frame;
    wherein the system is configured to be applied to the conventional transporting device in a releasable manner so as to return the conventional transporting device to an initial unconverted state if so desired by a user.

2. The system of claim 1, wherein the control unit comprises a cable system configured to permit the drive unit to direct the movement of the shelving unit, the cable system comprising at least one cable and at least one pulley.

3. The system of claim 2, wherein the control unit further comprises a winch upon which a portion of a cable is configured to be radially wound.

4. The system of claim 1, wherein the shelving unit comprises a base plate attached to the fixed platform wherein the base plate has a larger surface area than the fixed platform in order to provide stability to conventional transporting device when lifting or lowering a bulky load or a heavy load.

5. A system for temporarily converting a conventional transporting device with a transporting device frame having a fixed platform into a transporting device having an adjustable platform, the system comprising:
    a shelving unit configured to be releaseably secured to a frame of the transporting device in a manner so that a position of the shelving unit on the frame is configured to be adjusted, the shelving unit comprising: (a) a platform for supporting removable items thereon, and (b) a back plate configured to engage a portion of the transporting device frame, the back plate comprising at least one front roller, offset from at least one rear roller configured to minimize movement of the shelving unit in a first direction; at least one guide rollers arranged perpendicular to the at least one front roller and the at least one rear roller; wherein the plurality of rollers that minimize lateral movement of the shelving unit when being raised or lowered during operation; and
    a control unit for controllably adjusting an elevation of the shelving unit on the frame of the transporting device, the control unit comprising a drive unit for driving the shelving unit either to raise or lower the shelving unit relative to the transporting device frame, wherein the drive unit further comprises a cable system configured to permit the drive unit to direct movement of the shelving unit, the cable system comprising at least one cable, at least one pulley, and a winch upon which a segment of a cable is configured to be radially wound.

6. The system of claim 5, wherein the at least one pulley comprises a discrete component that is configured to be independently mounted to the frame.

7. The system of claim 5, wherein the winch is configured to permit manual operation.

\* \* \* \* \*